United States Patent [19]

Jorgenson et al.

[11] Patent Number: 5,427,596
[45] Date of Patent: Jun. 27, 1995

[54] DIAGNOSTIC AND CONTROL SYSTEM FOR DUST COLLECTOR

[75] Inventors: Ronald L. Jorgenson, Apple Valley, Minn.; David A. Saar, Lawrenceville, N.J.

[73] Assignee: Donaldson Company, Inc., Minneapolis, Minn.

[21] Appl. No.: 228,754

[22] Filed: Apr. 18, 1994

Related U.S. Application Data

[62] Division of Ser. No. 118,507, Sep. 8, 1993, Pat. No. 5,391,218.

[51] Int. Cl.⁶ .................. B01D 46/04; B01D 29/66
[52] U.S. Cl. ........................ 55/212; 55/215; 55/217; 55/274; 55/283; 55/302
[58] Field of Search ............... 55/210, 212, 215, 217, 55/218, 270, 274, 283, 301–305

[56] References Cited

U.S. PATENT DOCUMENTS

| | | | |
|---|---|---|---|
| 3,813,853 | 6/1974 | Anderson | 55/210 |
| 4,174,204 | 11/1979 | Chase | 55/283 |
| 4,214,882 | 7/1980 | Brenholt | 55/283 X |
| 4,312,645 | 1/1982 | Mavros et al. | 55/213 |
| 4,384,874 | 5/1983 | Dattilo | 55/273 |
| 4,443,235 | 4/1984 | Brenholt et al. | 55/218 |
| 4,465,497 | 8/1984 | Howeth | 55/218 X |
| 4,500,326 | 2/1985 | Sunter | 55/283 X |
| 4,507,130 | 3/1985 | Roth | 55/283 X |
| 4,509,960 | 4/1985 | Engel | 55/287 |
| 4,624,689 | 11/1986 | Volk et al. | 55/270 X |
| 4,751,501 | 6/1988 | Gut | 55/274 X |
| 4,786,293 | 11/1988 | Labadie | 55/283 X |
| 4,786,295 | 11/1988 | Newman et al. | 55/213 |
| 4,793,836 | 12/1988 | Griffis | 55/210 |
| 4,851,015 | 7/1989 | Wagner et al. | 55/283 X |
| 4,865,627 | 9/1989 | Dewitz et al. | 55/270 X |
| 5,042,997 | 8/1991 | Rhodes | 55/217 X |
| 5,116,395 | 5/1992 | Williams | 55/283 X |
| 5,161,100 | 11/1992 | Whipple | 55/210 X |
| 5,346,533 | 9/1994 | Jelich et al. | 55/270 X |
| 5,348,572 | 9/1994 | Jelich et al. | 55/270 X |

FOREIGN PATENT DOCUMENTS

| | | | |
|---|---|---|---|
| 0271470 | 6/1988 | European Pat. Off. | |
| 3336487 | 4/1985 | Germany | 55/283 |
| 60-143814 | 7/1985 | Japan | 55/283 |
| 61-90719A | 5/1986 | Japan | |
| WO87/07179 | 12/1987 | WIPO | |

OTHER PUBLICATIONS

*Nederman Filterbox with Message Monitor Instruction Manual*, pp. 1–11 (date unknown).
Exhibit A, memo to Ronald Jorgensen from Emanual Moreau, pp. 1–5 (Jul. 7, 1993).
Exhibit B, memo to Bonnie Schneider et al. from Ron Jorgensen, pp. 1–2 (Jul.8, 1993).
Exhibit C, memo to John Peterson from Robert Neal, pp. 1–3 (Sep. 18, 1991).
Exhibit D, memo re Amano Readout, p. 1 (Sep. 22, 1992).

*Primary Examiner*—Robert Spitzer
*Attorney, Agent, or Firm*—Merchant, Gould, Smith, Edell, Welter & Schmidt

[57] ABSTRACT

An integrated dust collector diagnostic and programmable control system. A microprocessor-based subsystem interfaces with a dust collector in order to receive information related to operating conditions of the dust collector. The microprocessor executes embedded software to analyze the information and perform the diagnostics. In response to the analysis, the microprocessor outputs control signals to the dust collector and activates a display panel in order to provide an indication of the dust collector operating conditions.

45 Claims, 17 Drawing Sheets

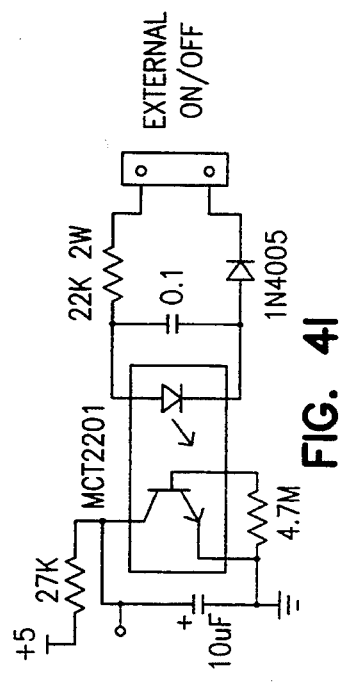
FIG. 4I
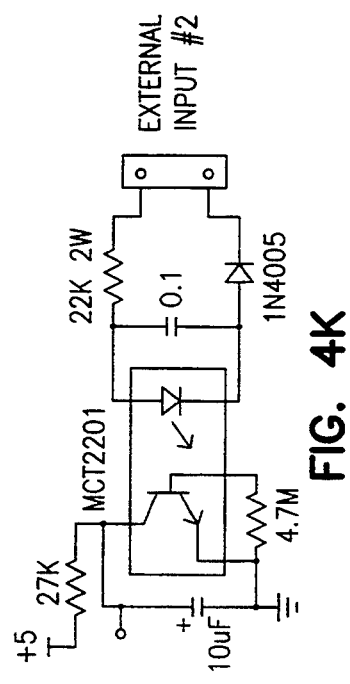
FIG. 4K
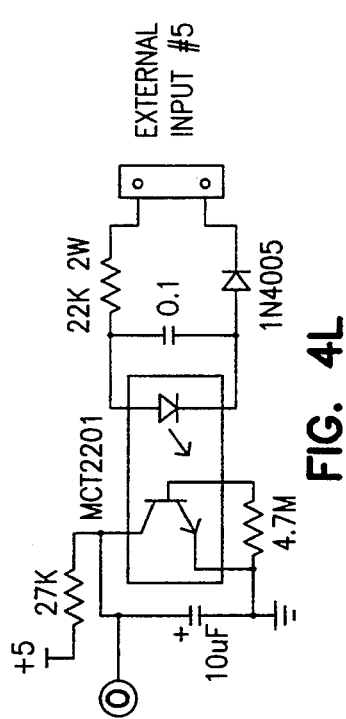
FIG. 4M
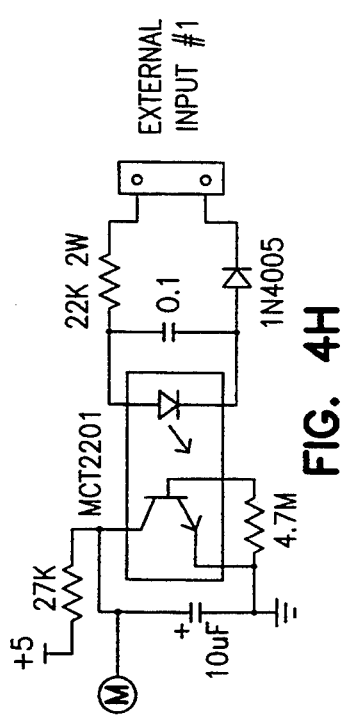
FIG. 4H
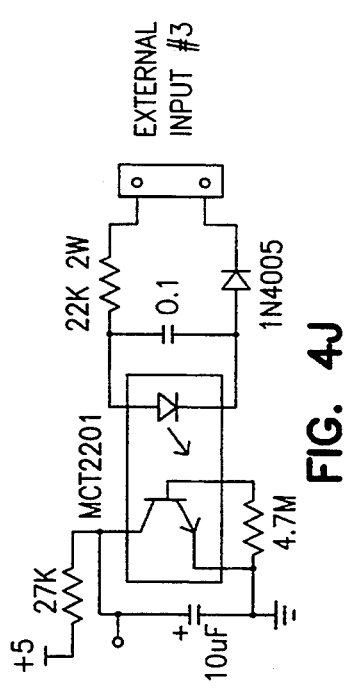
FIG. 4J
FIG. 4L

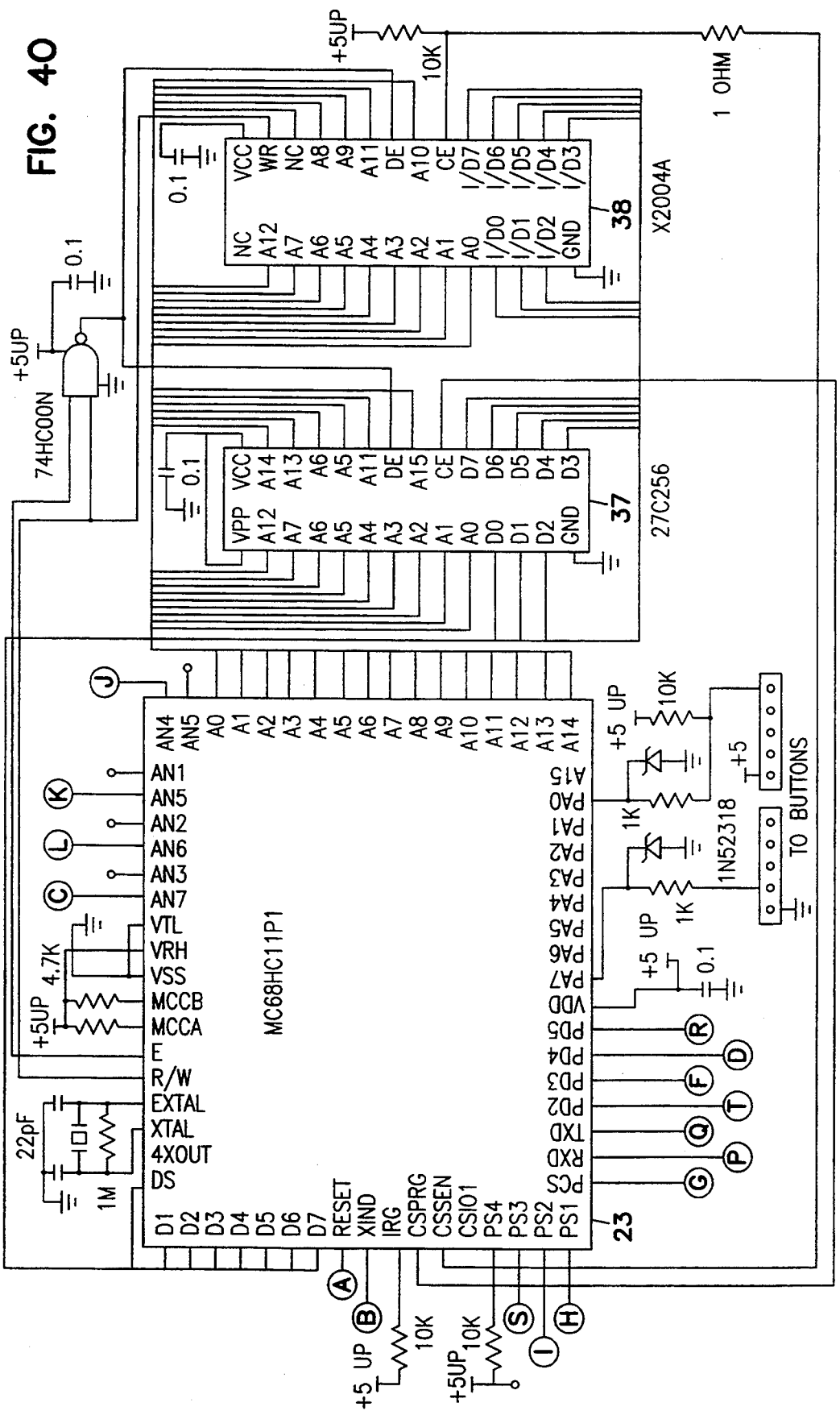

DIAGNOSTIC AND CONTROL SYSTEM FOR DUST COLLECTOR

This is a division, of application Ser. No. 08/118,507, filed Sep. 8, 1993, now U.S. Pat. No. 5,391,218.

FIELD OF THE INVENTION

The present invention relates to a system and method for performing diagnostics on and controlling a dust collector.

BACKGROUND OF THE INVENTION

Dust collectors remove solid particulate or other contaminants from air. These dust collectors operate by forcing the contaminated air through one or more filters which capture the contaminants. The dust collectors are usually self-cleaning and operate with a minimum of human intervention.

In order to service the dust collectors, however, manual inspection is typically required. The manual inspection is used to determine various operating conditions, such as an obstructed or ruptured filter. These dust collectors may have some systems for providing limited information related to other operating conditions, such as temperature, air flow rate, and differential air pressure across the filters. Also, some of these dust collectors use timed cleaning control or photohelics for invoking the self-cleaning functions. However, these systems do not provide for an integration of many functions in one system.

A need thus exists for an integrated programmable system that can electronically perform multiple diagnostics on a dust collector and in response control the dust collector and provide information related to the diagnostics. A need further exists for an integrated system that can replace, for example, timed cleaning control or photohelics for controlling cleaning functions within the dust collector.

SUMMARY OF THE INVENTION

This invention is an integrated diagnostic and control system for a dust collector. The system electronically receives information from the dust collector which corresponds to operating conditions of the dust collector. The system electronically processes this information in order to identify and analyze the various operating conditions of the dust collector. In response to this data analysis, the system can output electronic control signals to the dust collector and activate a display panel or computer display in order to provide a visual indication of the operating conditions.

In addition to the functions described above, the diagnostic and control system may have programmable inputs such as set points or other parameters. The system can thus control operation of the dust collector based on the programmable inputs, which represent desired operating conditions.

The diagnostic or operating conditions detected by the system may include: a cleaning failure detected by monitoring air pressure changes within the dust collector during cleaning; a filter rupture detected by a particular decrease in differential air pressure during normal operation; an obstructed filter detected by an increase, or lack of sufficient decrease, in differential air pressure during a cleaning cycle; and an air flow rate through the dust collector detected by sensing current supplied to a motor operating a fan as part of the dust collector system.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

DUST COLLECTOR OPERATION

Figure 1:
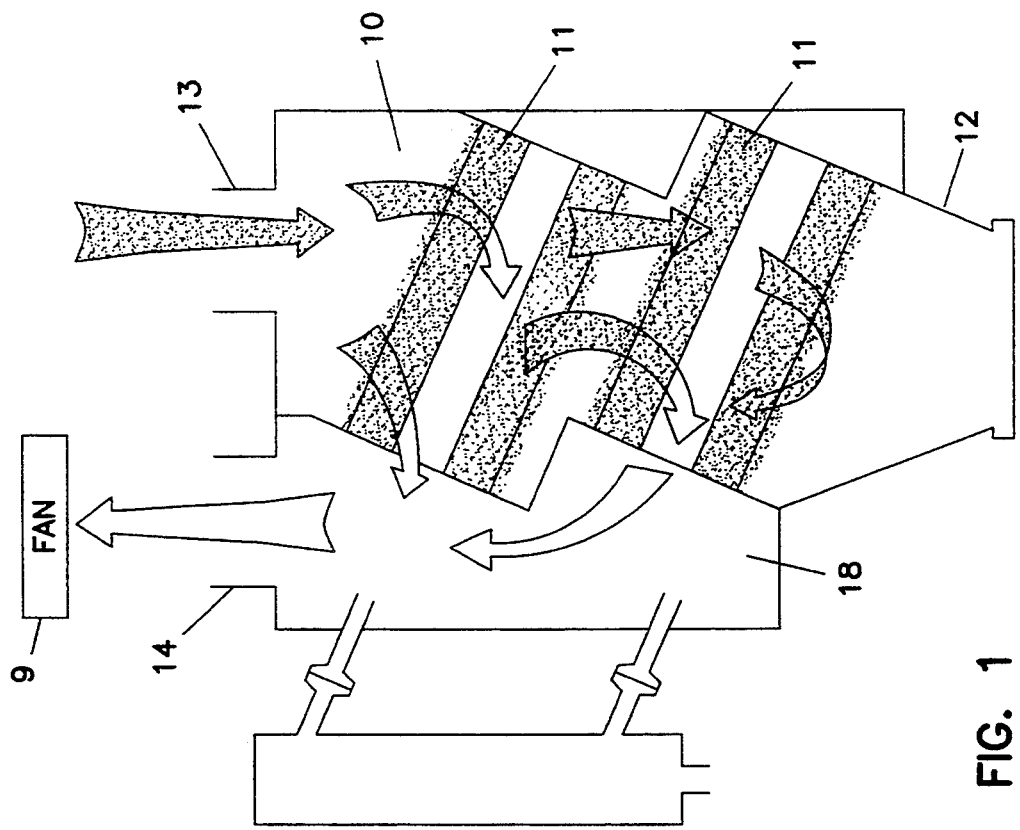
FIG. 1 is a diagram of a dust collector in normal operation.

FIG. 1 is a diagram showing the basic elements of a dust collector. The dust collector typically includes a dirty air chamber 10 for holding one or more filter elements 11. A dirty air inlet 13 receives the air to be filtered. A fan 9 is used to force the contaminated air through filter elements 11, which trap solid particulate from the contaminated air. A clean air chamber 18 receives the filtered air, and the dust collector then releases the filtered air from the clean air outlet 14. The system also includes a hopper 12 for containing the solid particulate removed from the filter elements.

Figure 2:
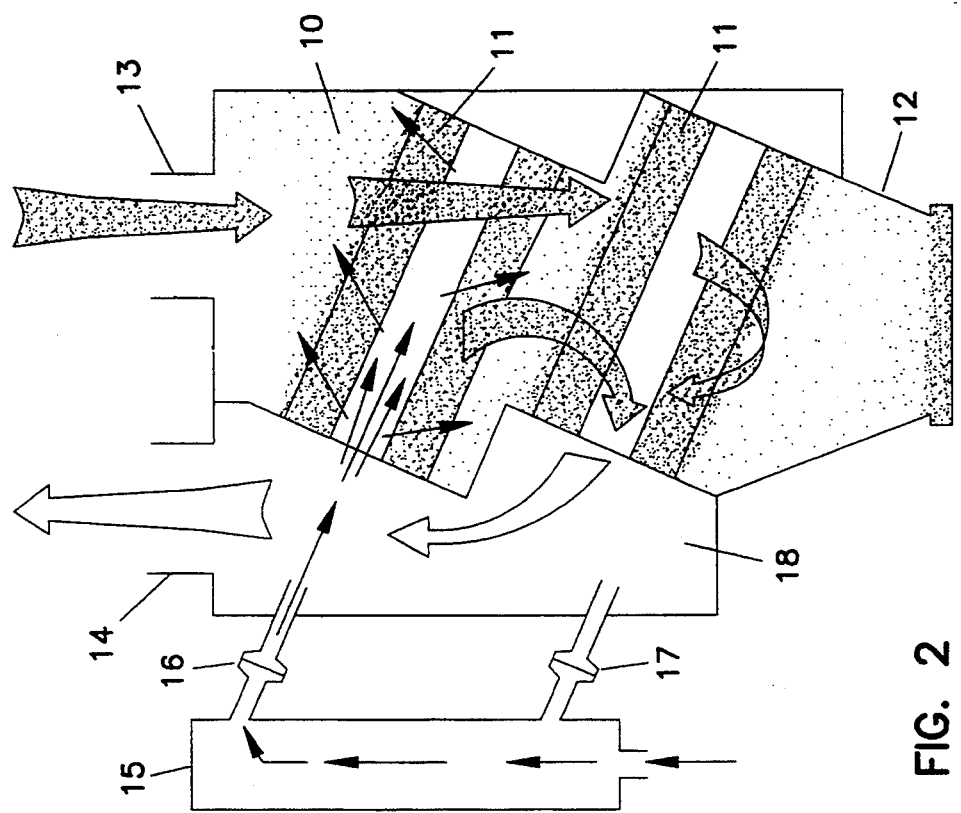
FIG. 2 is a diagram of a dust collector operating in a cleaning mode.

FIG. 2 is a diagram of a dust collector during a cleaning function or operation. As the filter elements 11 contain more solid particulate, the pressure drop between the dirty and clean air chambers within the dust collector increases and the air cleaning process becomes less efficient at collecting the solid particulate from the contaminated air. Therefore, dust collectors typically have a self-cleaning function, which uses a high-pressure reverse burst of air or other mechanical means to remove the solid particulate from the filter elements. Alternate methods of cleaning include, for example: mechanically "shaking" the filters; and directing a reverse burst of high-volume low pressure air toward the filter elements.

A manifold 15 directs a high-pressure burst of air through diaphragm valve 16. This high-pressure burst of air removes the solid particulate from the upper filter element or elements. The dust collector also includes a diaphragm valve 17 for directing a high-pressure burst of air during a cleaning function for the lower filter element or elements.

The dust collector typically performs cleaning functions in sequence, first opening diaphragm valve 16 and next opening diaphragm valve 17. The sequence of cleaning functions is often repeated many times for a cleaning process. The hopper 12 collects the solid particulate from filter elements 11 during the cleaning cycle and may be opened to remove the solid particulate. Each of the filter elements 11 may also be manually removed and replaced at the end of the filter life or, for example, when a filter becomes ruptured or permanently obstructed.

Figure 3:
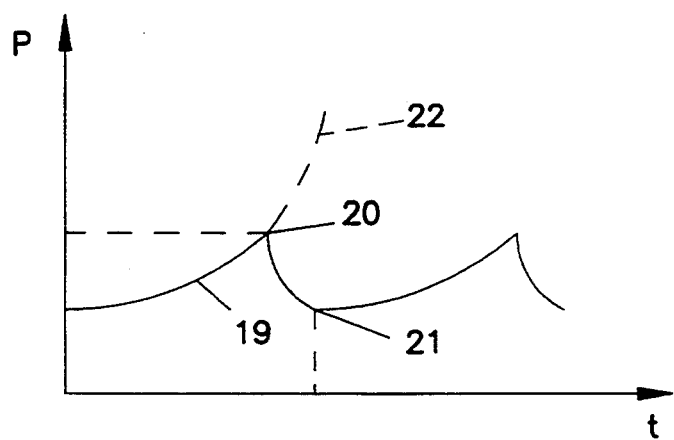
FIG. 3 is a differential pressure graph of a typical normal operation of a dust collector.

FIG. 3 is a graph of a typical dust collector operation. The graph shows the differential air pressure P between the dirty air chamber 10 and the clean air chamber 18 within the dust collector over time for normal operation. During operation, the differential pressure increases (19) while the filter elements remove the solid particulate from the contaminated air. At some maximum differential air pressure 20, a self-cleaning function which cleans the filter elements is invoked using the reverse burst of high-pressure air. This results in a decrease in the differential air pressure in the dust collector to a point 21, which represents the end of the cleaning function. The full cycle of operation then repeats itself. If a filter is obstructed, for example, line 22 shows how the differential air pressure may continue to increase despite the cleaning operation.

Examples of two dust collectors are shown in U.S. Pat. Nos. 4,443,235 and 4,509,960, both of which are assigned to Donaldson Company, Inc. and are incorporated herein by reference as if fully set forth.

SYSTEM HARDWARE

Figure 4A:
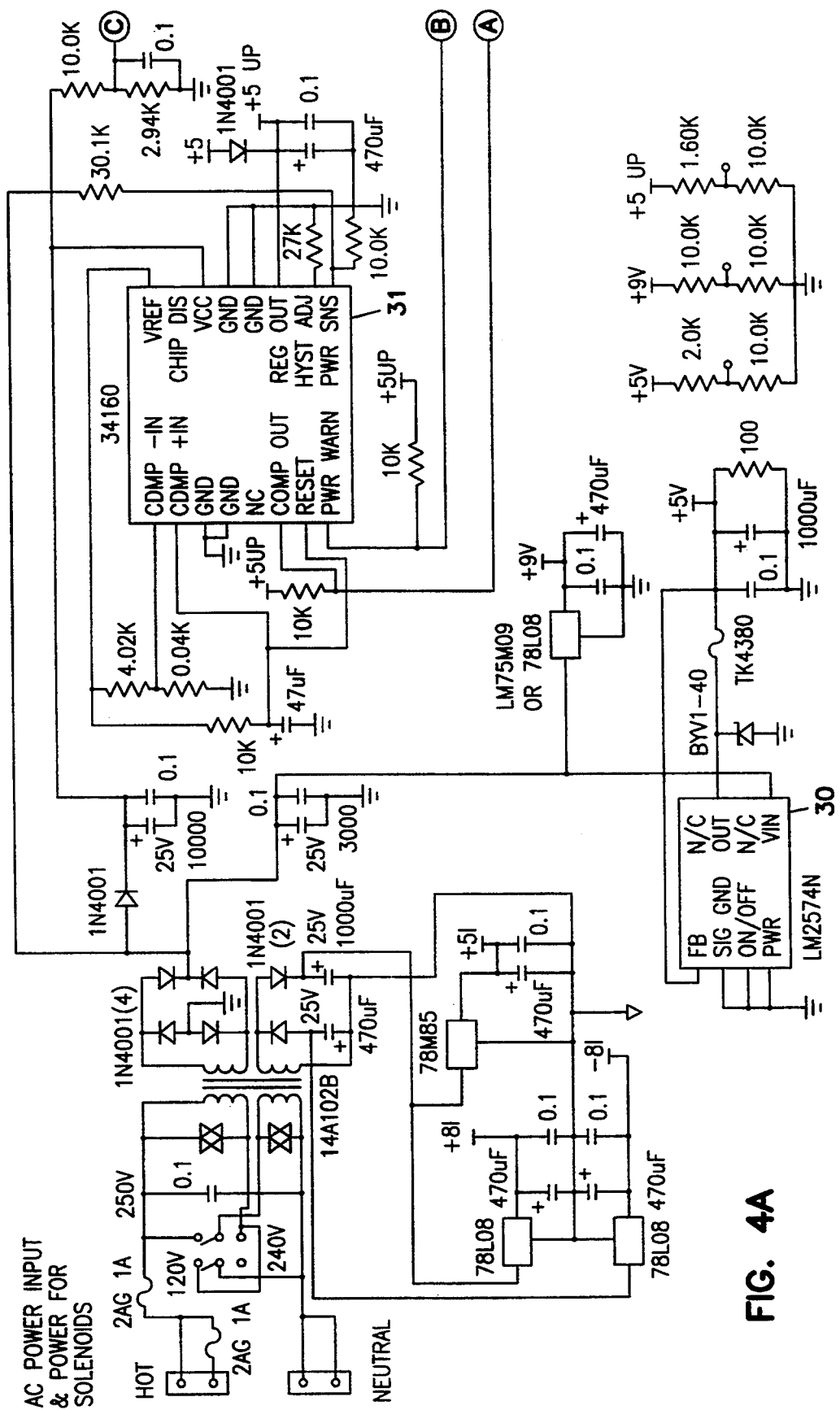
FIGS. 4A-4P are a preferred schematic diagram of a system that implements the present invention.
Figure 4B:
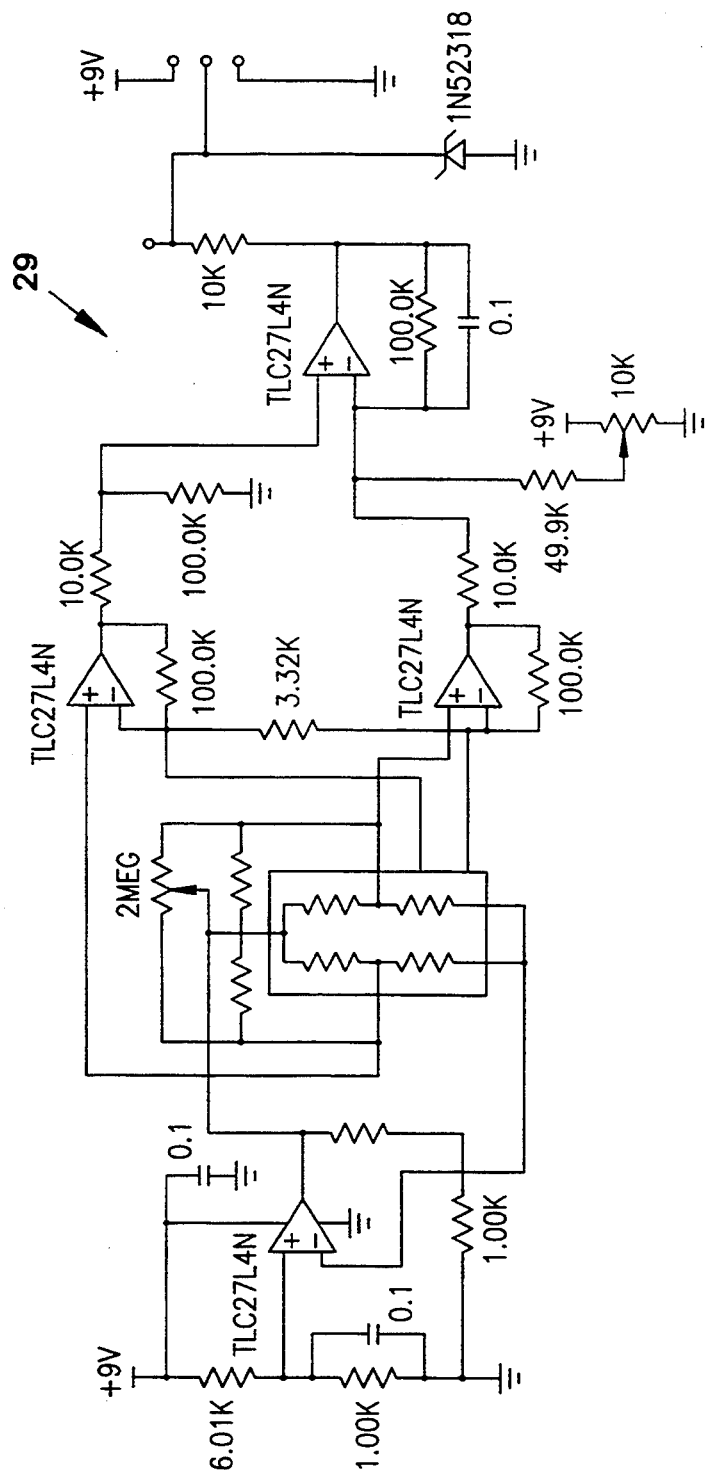
Figure 4C:
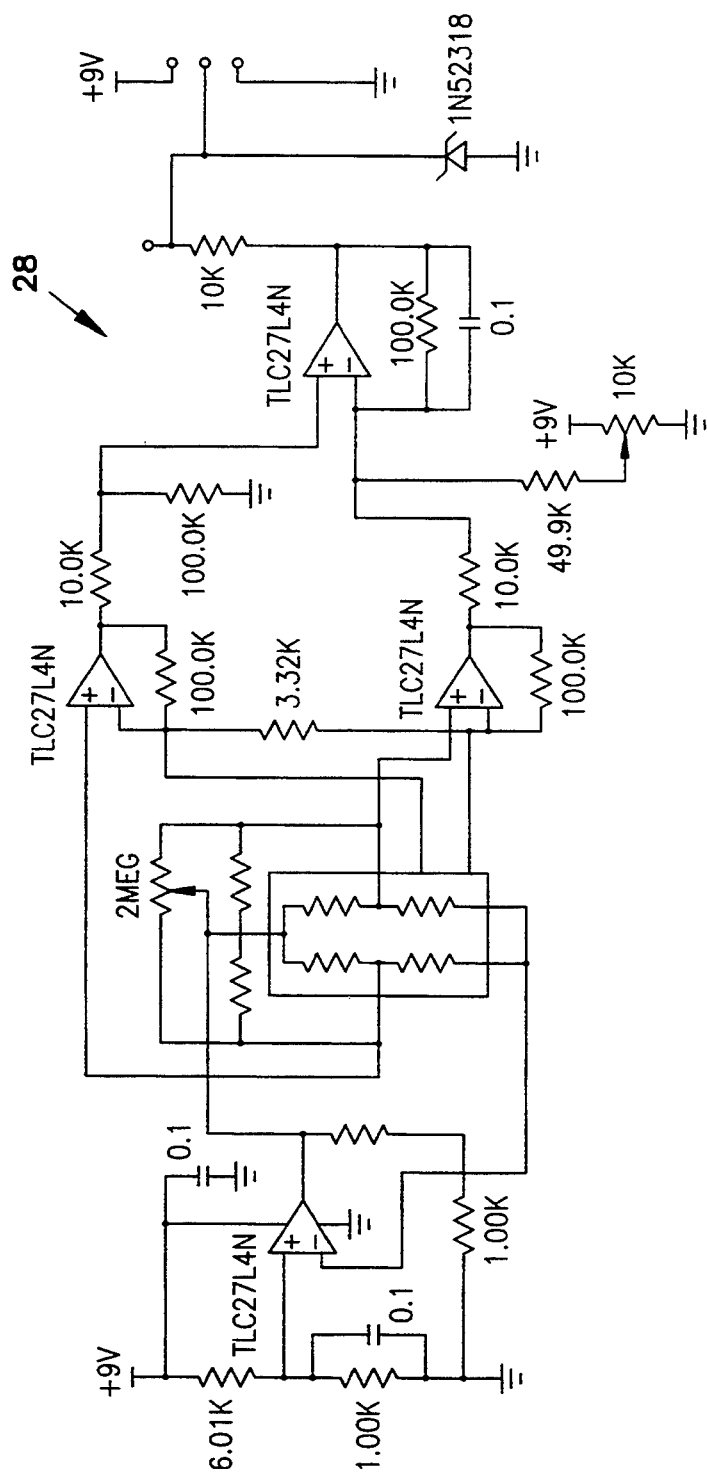
Figure 4D:
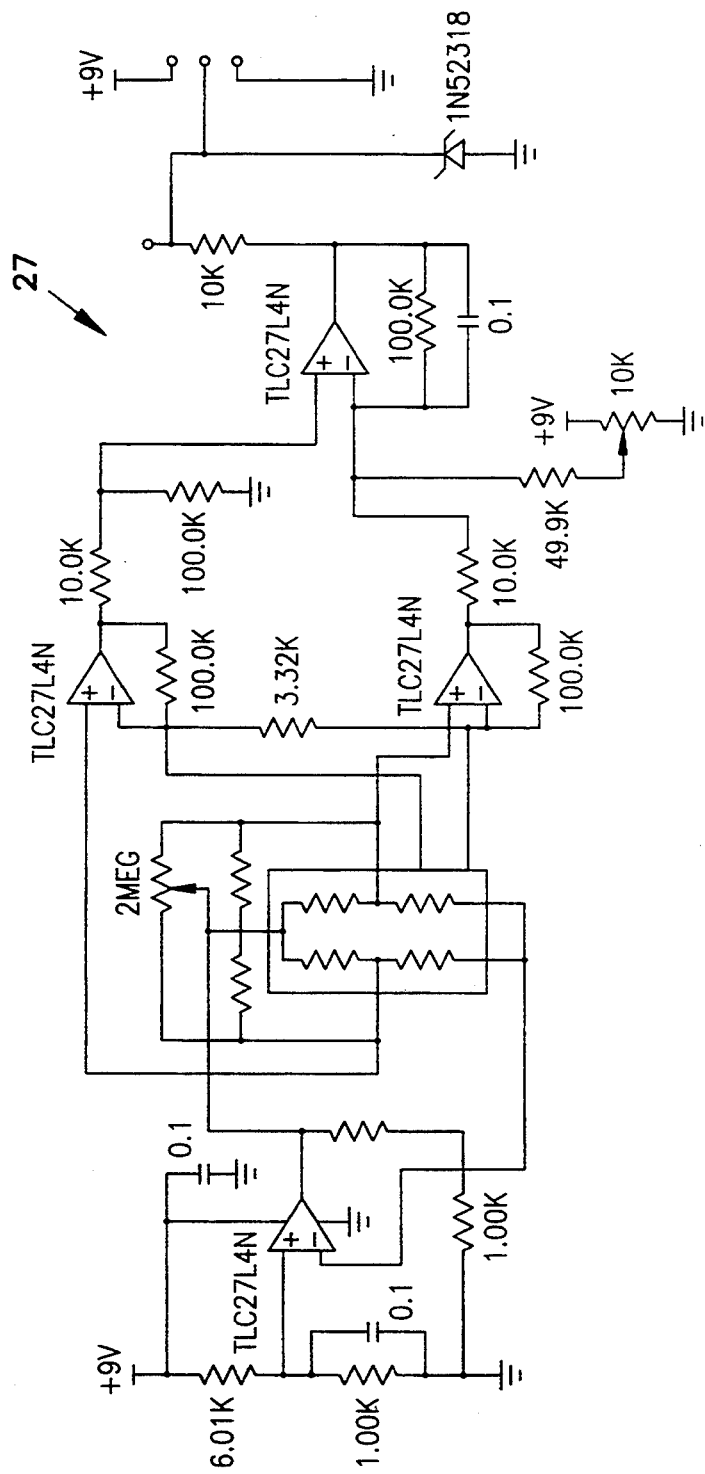
Figure 4E:
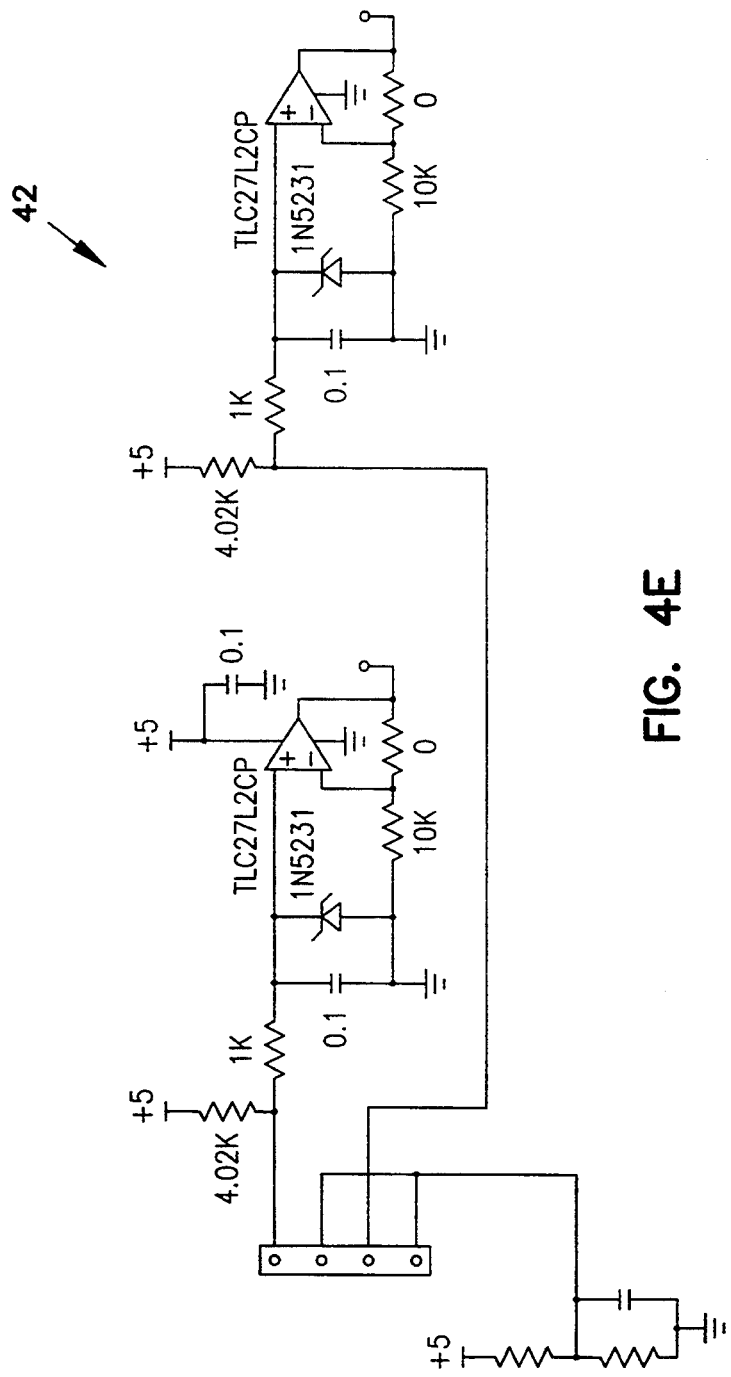
Figure 4F:
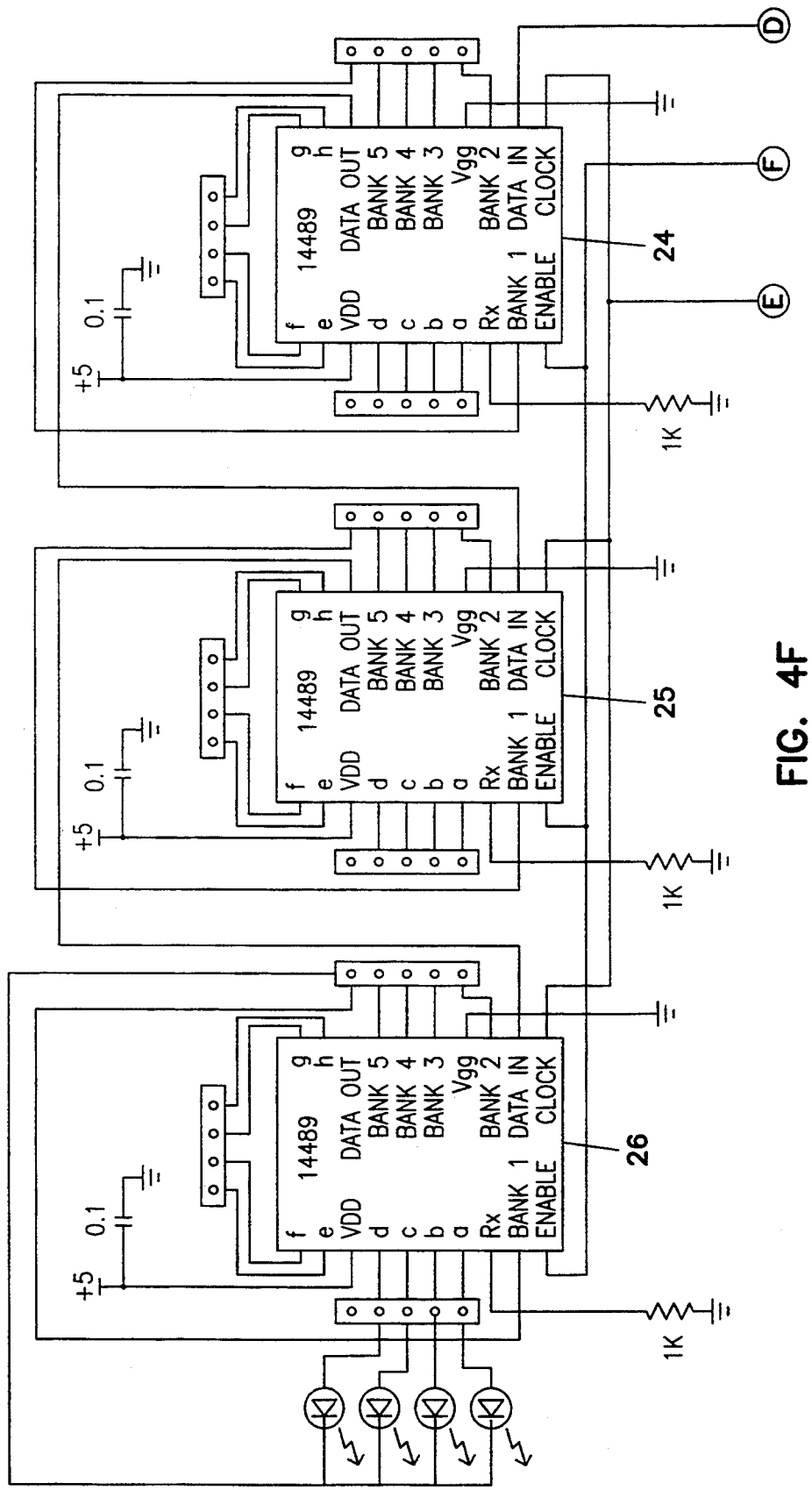
Figure 4G:
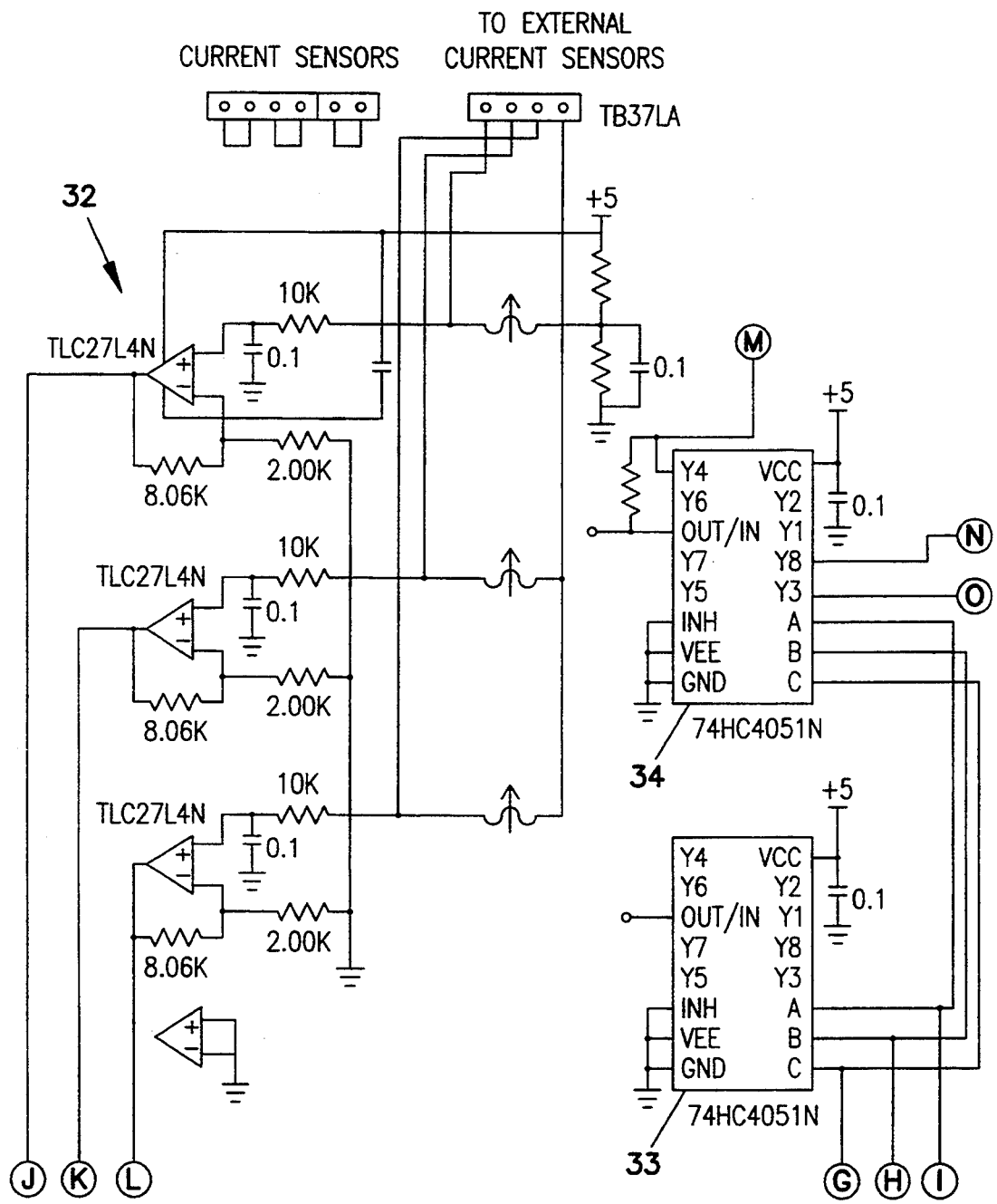
Figure 4N:
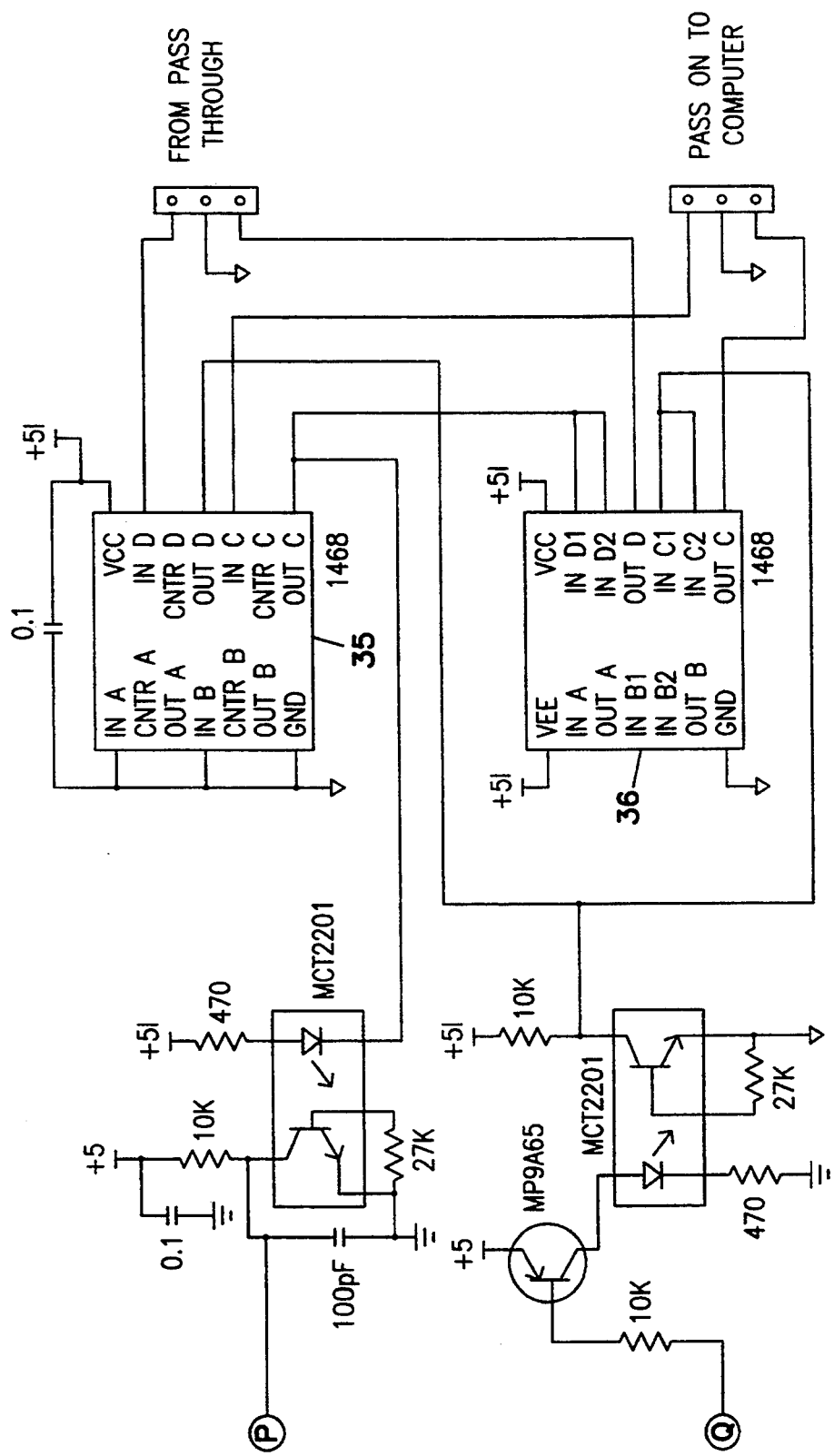
Figure 4P:
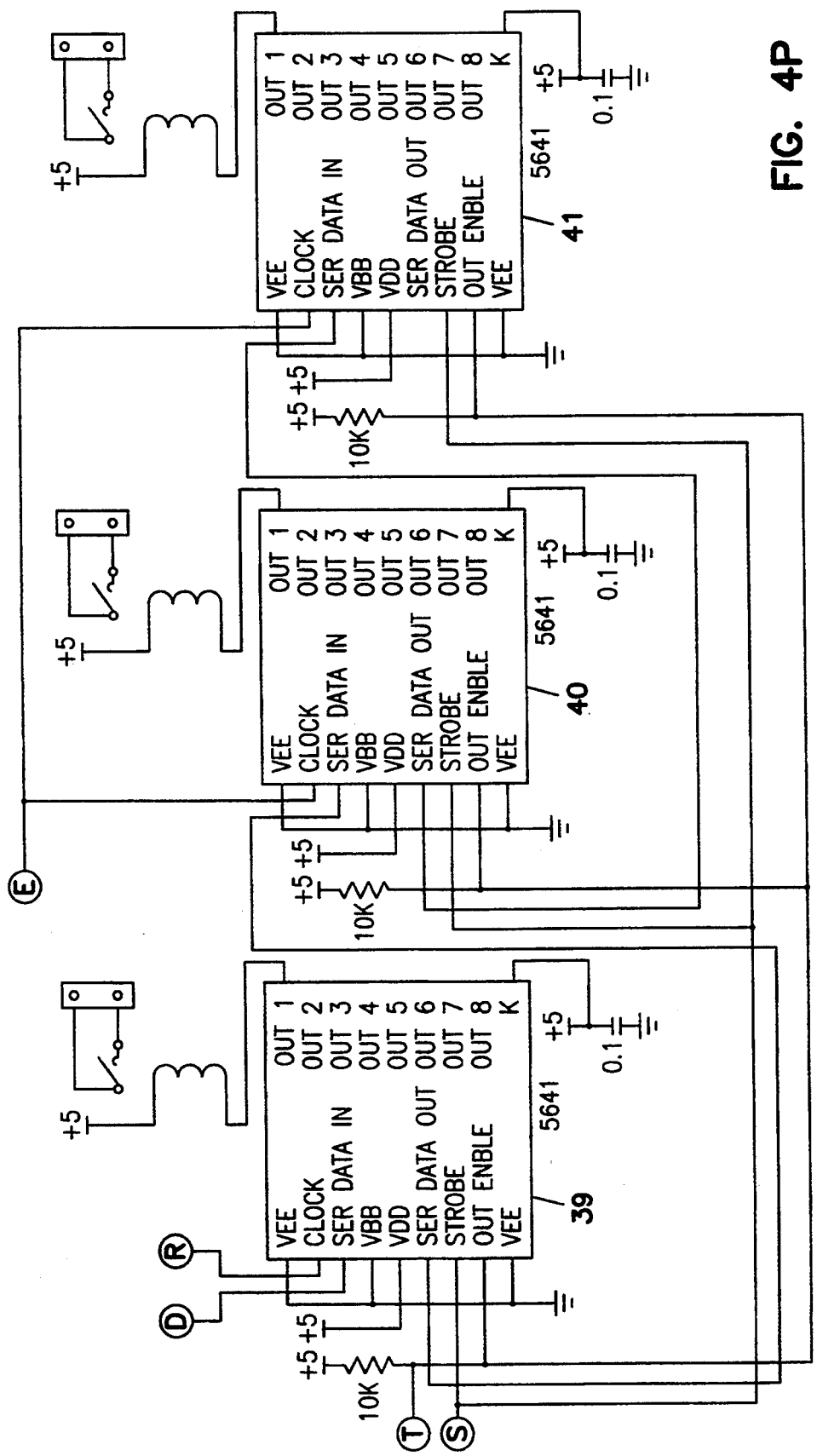

FIGS. 4A–4P are a schematic diagram of a preferred system that implements the present invention. The system preferably includes a microprocessor 23, which operates on embedded software contained in memory IC 37 and data contained in memory IC 38. The system may alternatively be implemented, for example, using a programmable gate array or hard-wired logic.

The microprocessor 23 is interfaced to circuits 39, 40 and 41, which are relay drivers for controlling relays coupled to cleaning valves in the dust collector. Circuits 24, 25 and 26 are LED drivers, which control output display elements in a display panel for providing a visual indication of various diagnostic and operating conditions of the dust collector.

Data for the microprocessor is provided by various circuits which transduce physical parameters of the dust collector. Circuits 27, 28 and 29 are three pressure sensors, which indicate various operating pressures of the dust collector as determined by the user. These typically include the differential air pressure and the shop air pressure in manifold 15. Circuits 42 are temperature sensors, which receive temperature signals related to temperatures within the dust collector. Circuits 32 are current sensors which receive current signals from the dust collector.

The remaining ICs perform the following functions. IC 30 is a standard power supply regulator. IC 31 is the power supply for the system. IC 33 and 34 are analog voltage multiplexers. ICs 35 and 36 are RS 232 drivers, which receive data from and can transmit data to an external device, such as a computer for remote monitoring and control.

DISPLAY PANEL

Figure 5:
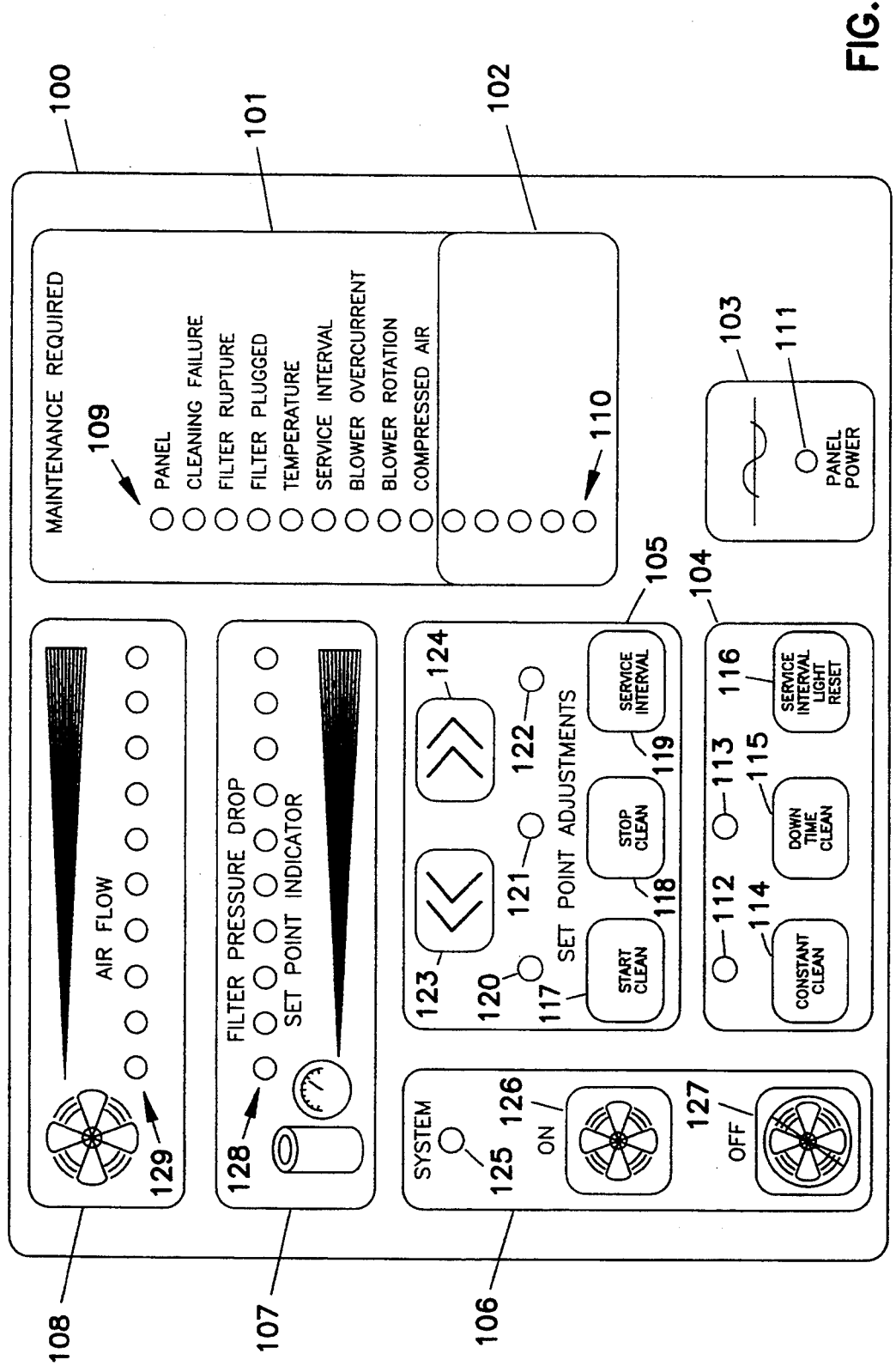
FIG. 5 is a diagram of a preferred display panel for the present invention.

The system hardware shown in FIGS. 4A–4P typically interfaces a display panel for displaying information related to the dust collector diagnostics and operating conditions. FIG. 5 is a diagram of a preferred display panel 100. A display 103 includes an indicator 111, which is activated when power is being supplied to the diagnostic and control system. Display panel 100 typically includes the following features for providing indications of dust collector operating conditions.

Display 101 includes a plurality of indicators 109 for "maintenance required" or operating conditions. The indicators are typically implemented with LEDs or "lights." Display 101 preferably contains the following predefined indicators.

A "panel" indicator represents a malfunction in the diagnostic system itself, which is typically detected by sensing incorrect power supply voltages.

A "cleaning failure" indicator represents a failure that resulted during the dust collector cleaning cycle, which is typically detected by monitoring the shop air manifold air pressure or differential air pressure across the filters during cleaning.

A "filter rupture" indicator represents a rupture of a filter, which is typically detected by a particular rate of decrease in differential air pressure across the filters.

A "filter plugged" indicator represents an obstructed filter, which is typically detected by a failure of the differential pressure across the filters to decrease during a cleaning cycle.

A "temperature" indicator represents a temperature alarm condition in the dust collector such as, for example, a temperature which has exceeded a filter's temperature rating.

A "service interval" indicator represents a predefined service interval, which is typically a user defined period of time such as, for example, when it is time to change the dust pan in the dust collector.

A "blower overcurrent" indicator represents a condition where an excessive amount of current is being drawn by the motor driving the dust collector fan.

A "blower rotation" indicator represents a condition where the fan is not rotating in the correct direction, in a three-phase system, for proper dust collector operation.

A "compressed air" indicator represents a fault in a shop air system. The shop air system provides a source of high pressure air to manifold 15 for use in the cleaning function. The shop air pressure is typically maintained between 90–100 psi, and if the shop air pressure drops below approximately 70 psi, for example, the system activates the "compressed air" indicator.

A display 102 includes a plurality of indicators 110 for user-defined fault conditions. A user can program the system to activate any of the indicators 110 when particular conditions occur in the dust collector. Examples of user-defined fault conditions include indications that: a motor has stopped rotating; a hopper is over full; or a fault has occurred in a process interfaced with the dust collector.

A user preferably programs the user-defined fault conditions by using pairs of connectors on a circuit board that contains the circuit shown in FIGS. 4A–4P. The circuit board contains one pair of connectors for each of the five plurality of indicators 110. A user programs a particular one of the indicators 110 by first locating the corresponding pair of connectors on the circuit board. One of the connectors in the pair is connected to ground. The other corresponding connector in the pair is typically connected through a switch, controlled by a particular fault condition, to a voltage source. Therefore, when the fault occurs, the switch closes and a voltage is present across the pair of connectors. In response to the voltage across the connectors, the system activates the corresponding indicator in the plurality of indicators 110.

Displays 106–108 provide an indication of diagnostic or operating conditions of the dust collector. The display 106 includes a "system" indicator 125, which is activated when the dust collector system is in operation. An ON button 126 is used for turning on the dust collector fan. An OFF button 127 which is used for turning off the dust collector fan. The display 107 includes a plurality of indicators 128, which are used both in displaying the differential air pressure and in programming operating conditions by providing an indication of differential air pressure set points. The display 108 includes a plurality of indicators 129, which provide an indication of air flow rate.

A display 104 includes buttons, and corresponding indicators, for programming the cleaning process of the dust collector. The indicators are activated when the corresponding function is invoked. A CONSTANT CLEAN button 114, and corresponding indicator 112, is used for causing manual cleaning of the dust collector. When a user presses the CONSTANT CLEAN button 114, the system typically ignores pressure readings and delivers the high pressure cleaning pulse from manifold 15 typically every ten seconds until the user presses the CONSTANT CLEAN button 114 again to turn off the function.

A DOWNTIME CLEANING button 115, and corresponding indicator 113, is used to activate cleaning of the dust collector during non-operating conditions. A SERVICE INTERVAL LIGHT RESET button 116 is used for resetting the "service interval" light in the display 101.

A display 105 includes buttons, and corresponding indicators, for allowing a user to program the operation of the dust collector. The display 105 preferably includes: a START CLEAN button 117, and corresponding indicator 120, for programming a differential pressure at which the system initiates a cleaning process; a STOP CLEAN button 118, and corresponding indicator 121, for programming a differential air pressure at which the system stops the cleaning process; and a SERVICE INTERVAL button 119, and corresponding indicator 122, for programming a differential time period at which the system activates the "service interval" indicator in the display 101.

For programming the operating conditions, a user first presses one of the buttons 117–119, and the corresponding indicator 120–122 is activated. The user can then manipulate a "decrease" button 123 and "increase" button 124 for establishing a set point for the selected operating condition. The plurality of indicators 128 in the display 107 provide a visual indication of an increase or decrease in the set point as the user manipulates the "increase" and "decrease" buttons.

SYSTEM SOFTWARE

The embedded software executed by microprocessor 23 preferably comprises two program loops: a main loop and an interrupt loop.

Main Loop

Figure 6:
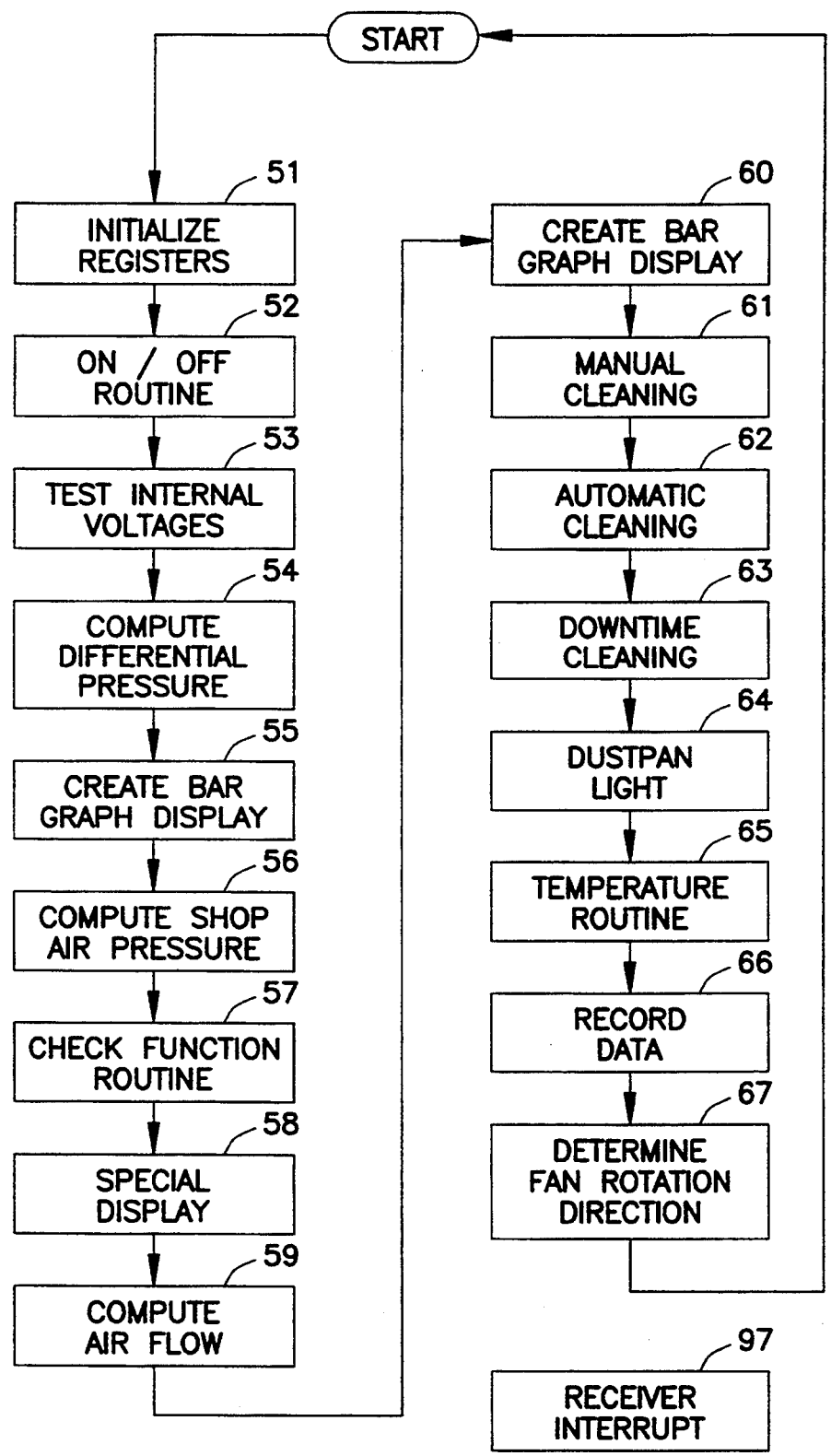
FIG. 6 is a flow chart of a main loop within the software executed by the system.

The main loop contains the basic functions of the system, and the interrupt loop is executed by the microprocessor for real time interrupts. FIG. 6 is a flow chart showing preferred functions of the main loop for the embedded software. The main loop preferably contains the following routines.

Initialization:
Routine 51 initializes key registers used during the execution of the main loop.

On/Off:
Routine 52 turns the dust collector fan on and off. The values or positions of the ON and OFF buttons 126 and 127 from display panel 100 are read. Routine 52 then controls relay drivers 39–41 in response to the ON and OFF buttons 126 and 127 in order to turn the dust collector fan on or off.

Voltage Test:
Routine 53 tests the internal voltages within the dust collector. Routine 53 preferably tests the line voltage and all of the supply voltages for the circuit shown in FIGS. 4A–4P. If any of the tested voltages are not within an appropriate operating range, then routine 53 turns on the "panel" indicator on display panel 100.

Differential Pressure:
Routine 54 reads in pressure readings from pressure sensors 27–29, which provide an indication of the differential air pressure between the dirty air chamber 10 and the clean air chamber 18 within the dust collector. Based on the pressure readings, routine 54 computes the differential air pressure and stores the resulting value.

Create Bargraph Display:
Routine 55 formats and displays differential air pressure and set point data in the bargraph created by the plurality of indicators 128 in the display 107. Routine 55 typically uses numerical values from zero to ten for activating the plurality of ten indicators 128. The value indicates the number of indicators to be activated. For example, a value of five means that the first five indicators are activated, and a value of ten means that all ten indicators are activated.

The numerical value for activating the indicators 128 depends on the system's mode of operation, which determines whether differential air pressure or set point data is display on the indicators 128. If the system is in a programming mode, the value is obtained from reading the user's manipulation of the "increase" and "decrease" buttons 123 and 124 while in a programming mode. If the system is not in a programming mode, then routine 55 obtains the value from routine 54, which calculates the differential air pressure.

Shop Air Pressure:
Routine 56 computes a shop air pressure and alarm condition. A pressure reading is first read from one of pressure sensors 27–29, which indicates shop air pressure in manifold 15. Routine 56 then preferably compares the received shop air pressure value with a predefined shop air pressure value. If the pressure reading is less than the predefined value, then routine 56 preferably activates the "compressed air" indicator on display panel 100.

Function Key Handler:
Routine 57 allows the system to set cleaning pressure and service interval set points, as described above in the description of display panel 100.

Special Display:

Routine 58 performs additional functions for formatting data, as explained with respect to the bargraph routine 55, for double resolution set points in the plurality of set point indicators 128 in the display 107.

Air Flow:

Routine 59 computes air flow from motor current. Routine 59 preferably uses a table to match motor current values with the corresponding air flow rate. Routine 59 reads in a motor current value from one of current sensors 32 and compares it with air flow rates in the table until a match is found. Routine 59 then typically stores the corresponding air flow rate for display by a bargraph routine 60, explained below.

Other equivalent methods of calculating air flow rate from motor current are possible, such as using a formula that converts a motor current value into the corresponding air flow rate value.

Create Second Display:

Routine 60 formats and displays air flow data in the bargraph created by the plurality of indicators 129 in the air flow display 108. As explained above with respect to routine 55, routine 60 also typically uses numerical values from zero to ten for activating the plurality of ten indicators 129. The numerical value for activating the air flow indicators 129 is obtained from the compute air flow routine 59.

Manual Cleaning:

Routine 61 controls the dust collector for manual cleaning. The CONSTANT CLEAN button 114 is read from display panel 100. Routine 61 in response initiates a cleaning cycle for the dust collector and preferably only initiates the cleaning cycle when the dust collector fan is on. For the cleaning cycle, routine 61 controls relay drivers 39–41 in order to generate the reverse burst of high pressure air from manifold 15 for removing particulate from the dust collector filters.

Automatic Cleaning:

Routine 62 controls the dust collector for automatic cleaning based on the differential air pressure. As explained above with reference to FIG. 3, the differential air pressure increases as the filters become increasingly obstructed with particulate. Routine 62 monitors the differential air pressure using pressure sensors 27–29. At a predefined differential air pressure value as shown by point 20 in FIG. 3, routine 62 automatically initiates the cleaning process by controlling relay drivers 39–41 in order to generate the reverse burst of high pressure air from manifold 15 for removing particulate from the dust collector filters.

Downtime Cleaning:

Routine 63 controls the dust collector for downtime cleaning. The DOWNTIME CLEAN button 115 is read from display panel 100. Routine 63 in response initiates a series of cleaning cycles by controlling relay drivers 39–41 in order to generate the reverse burst of high pressure air from manifold 15 for removing particulate from the dust collector filters.

Dust Pan Light:

Routine 64 turns on and off a "dust pan" indicator, which is typically implemented using the "service interval" indicator on display panel 100. Routine 64 stores a value indicating the last time that the "dust pan" indicator was activated. If a predefined amount of time has elapsed from last activating the "dust pan" indicator, then routine 64 turns on the "dust pan" indicator. If the SERVICE INTERVAL LIGHT RESET button 116 was activated, then routine 64 turns off the "dust pan" indicator.

Temperature:

Routine 65 receives temperature information from temperature sensors 42 and determines various temperatures. Routine 65 preferably uses a table to match readings from temperature sensors 42 with the corresponding temperature in Fahrenheit or Celsius. A formula could also be used for converting temperature sensor values into an appropriate temperature unit.

Record Storage:

Routine 66 determines if a record storage time has elapsed in order to determine if new parameters should be stored in memory on the control and diagnostic board. If a predefined interval has elapsed, then routine 66 typically reads in and stores three pressure readings, air flow, temperature, and alarm data.

Fan Rotation:

Routine 67 determines the direction of the fan rotation for three-phase systems. Routine 67 preferably determines the rotation direction by analyzing the phase relationship of three-phase current. A set of three fan current values are first read from current sensors 32. The values of the current readings are then compared with each other in order to infer correct or incorrect fan rotation direction by use of the phase relationship, and if the direction is correct for proper dust collector operation. If the fan is not rotating in the correct direction, then routine 67 activates the "blower rotation" indicator on display panel 100.

Interrupt Loop

Figure 7:
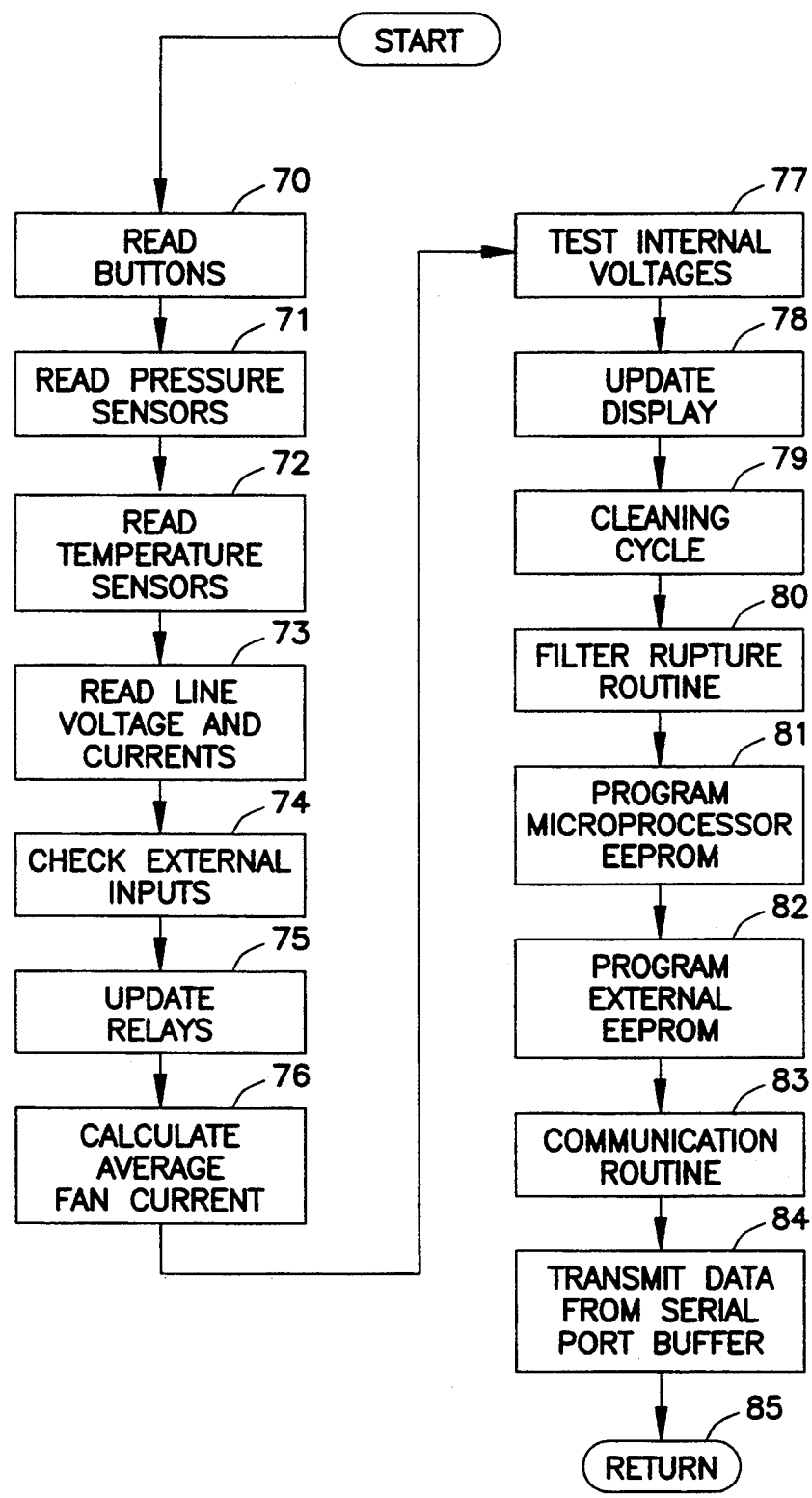
FIG. 7 is a flow chart of an interrupt loop within the software executed by the system.

FIG. 7 is a flow chart showing a preferred interrupt loop, which the microprocessor executes upon receiving a real time interrupt. The interrupt loop typically contains the following routines.

Button Routine:

The system typically first reads in the buttons on display 100 (routine 70);

Read Sensors:

The system typically next reads in various input parameters: pressure sensor readings from pressure sensors 27–29 (routine 71); temperature sensor readings from temperature sensors 42 (routine 72); line voltage and currents, including readings from current sensors 32 (routine 73); and external inputs (routine 74).

Relay Settings:

Routine 75 updates the relay settings, using relay drivers 39–41, typically based on the latest calculations from the receive data routines 70–74.

Fan Current:

Routine 76 calculates the average fan current over several readings. A preferred routine averages the fan current over 256 readings. Routine 76 continuously reads fan current values into a register in order to accumulate a running total and then divides the total by 128 by shifting the register to the right seven times. The value stored is thus the average current times two. If the average fan current exceeds a predefined maximum value, routine 76 activates the "blower overcurrent" indicator on display panel 100.

Test Internal Voltage:

Routine 77 performs a test of internal voltages. Routine 77 preferably tests the line voltage and all of the supply voltages for the circuit shown in FIGS. 4A–4P. If any of the tested voltages are not within an appropriate operating range, then routine 77 preferably turns on the "panel" indicator on display panel 100.

Update Display:

Routine 78 updates the indicators on display panel 100 based on the latest calculations from the receive data routines 70-74. This includes updating: the plurality of indicators 109 in the display 101; the plurality of indicators 110 for user-defined fault conditions in the display 102; the indicators 112 and 113 for cleaning functions in the display 104; the indicators 120-122 for set point adjustments and service intervals in the display 105; and the indicator 125 for system operation in the display 106.

Cleaning Cycle:

Routine 79 invokes the basic cleaning cycle if it is enabled. Routine 79 controls relay drivers 39-41 in order to activate the high pressure reverse burst of air from manifold 15 for cleaning the dust collector filters. During the cleaning cycle, routine 79 also reads in the differential air pressure from pressure sensors 27-29 in order to detect an increase in clean air chamber (10) pressure, which indicates a successful cleaning process (see point 21 in FIG. 3). The increase in the measured clean air chamber pressure may be indicated by a change in the differential pressure across the filters. If the increase in the measured clean air chamber pressure does not occur, which indicates a cleaning failure as shown by line 22 in FIG. 3, then routine 79 activates the "cleaning failure" indicator on display panel 100.

Routine 79 can also detect a cleaning failure by monitoring the air pressure in manifold 15 during the cleaning process. When the manifold delivers the high pressure reverse burst of air, the manifold air pressure momentarily decreases. Routine 79 can monitor the manifold air pressure and activate the "cleaning failure" indicator on display panel 100 if a decrease in the manifold air pressure does not occur during cleaning.

Filter Rupture:

Routine 80 performs a filter rupture calculation. Routine 80 preferably determines if a filter is ruptured by detecting a drop of two units of differential air pressure in a three second period during normal operation (not during a cleaning cycle). Routine 80 reads in differential air pressure values from pressure sensors 27-29 during one second intervals and stores the readings in a buffer. In order to perform the filter rupture calculation, routine 80 preferably first adds two units to a current pressure reading. Routine 80 then compares the current pressure reading increased by two units plus one with a pressure reading from three seconds previously as stored in the buffer. If the comparison indicates that the differential air pressure readings differ by more than two units, then routine 80 turns on the "filter rupture" indicator on display panel 100.

Memory Program:

Routines 81 and 82 program and write data to the EEPROM. The data may include readings from pressure sensors 27-29, temperature sensors 42, and current sensors 32.

Communication:

Routine 83 responds to information requests or commands from an internal serial port, and also allows setting of parameters in memory to control operation of the above functions. Routine 84 transfers data from the internal serial port transmit buffer.

After completion of the interrupt loop, the system returns at step 85 to processing within the main loop.

Receiver Interrupt

Routine 97 (see FIG. 6) indicates to the communication routine that data has been received.

MULTIPLE DUST COLLECTOR CONTROL

Figure 8:
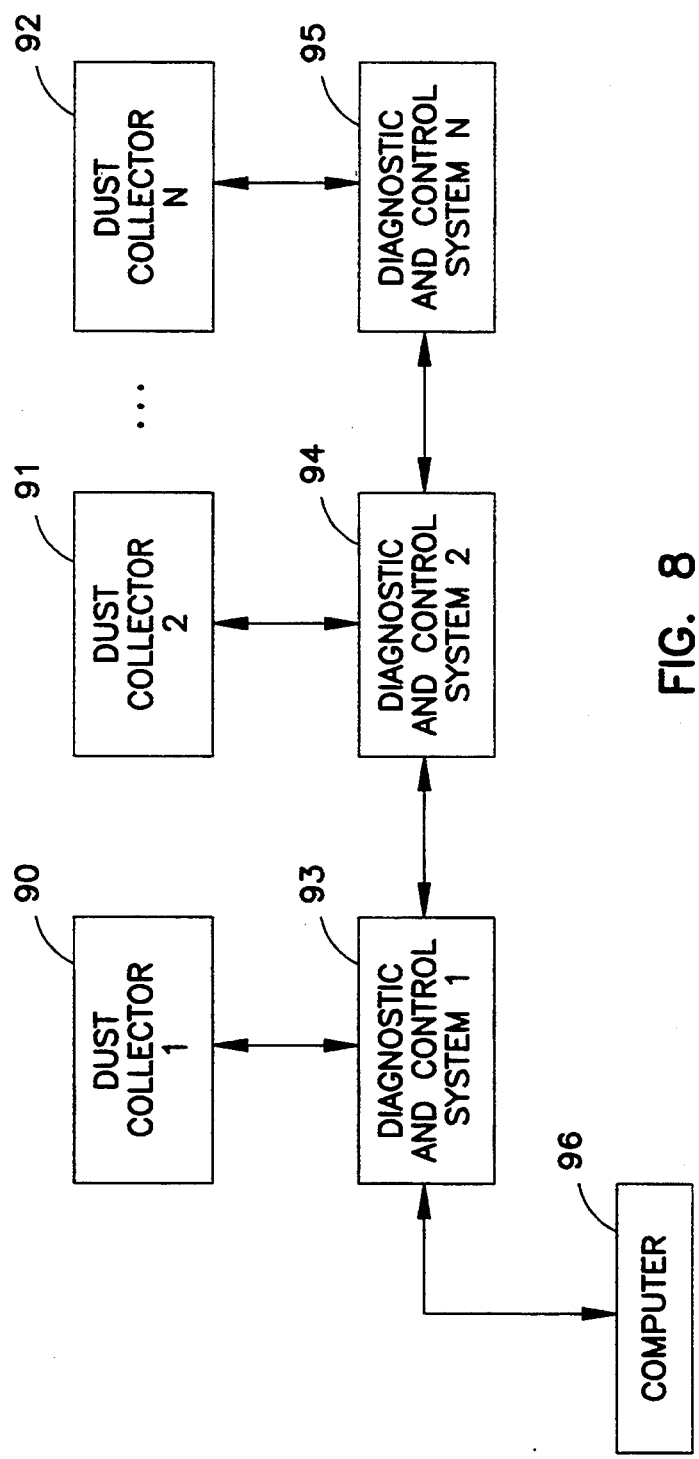
FIG. 8 is a block diagram showing the use of the present invention with multiple dust collectors.

FIG. 8 is a diagram that shows how the present invention may be used with multiple dust collectors. Each of a plurality of dust collectors 90-92 is coupled to a corresponding diagnostic and control system 93-95. The dust collectors 90-92 and corresponding diagnostic and control systems 93-95 are coupled together in a daisy chain configuration, which is coupled to a computer 96. Each diagnostic and control system 93-95 typically operates as described above, except that a display panel 100 is not necessary for each system.

Each dust collector is assigned a unique address. Computer 96 monitors and controls each dust collector by using the dust collector addresses to send and receive data on the daisy chain path to the diagnostic and control system for a selected dust collector. Computer 96 typically is programed to sequence through the dust collectors 90-92, monitoring and controlling each of the dust collectors 90-92 in series.

While the present invention has been described in connection with the preferred embodiment thereof, it will be understood that many modifications will be readily apparent to those skilled in the art, and this application is intended to cover any adaptations or variations thereof. For example, different hardware components or software routines may be used without departing from the scope of the invention. Also, the display panel may provide an audible or digital numerical indication of dust collector operating conditions, either in addition to or as a substitute for the visual indications. It is manifestly intended that this invention be limited only by the claims and equivalents thereof.

What is claimed is:

1. An integrated system for controlling operation of a dust collector and for detecting cleaning failures within the dust collector, comprising:
  a) receive means for receiving a plurality of signals representing a plurality of measured parameters of the dust collector;
  b) processing means for monitoring and controlling operation of the dust collector, comprising:
    i) monitoring means for processing the signals representing the measured parameters in order to determine operating conditions and cleaning failures of the dust collector; and
    ii) control means for generating control signals in response to the operating conditions in order to maintain the operation of the dust collector and for generating diagnostic signals in response to the cleaning failures; and
  c) output means for transmitting the control signals to the dust collector, and for transmitting the diagnostic signals to an output device in order to provide an indication of the cleaning failures.

2. The system of claim 1 further comprising display means for providing a visual indication of the measured parameters.

3. The system of claim 2 wherein:
  a) the receive means comprises means for receiving a signal representing a temperature within the dust collector; and
  b) the display means comprises means for providing a visual indication of the temperature.

4. The system of claim 3 wherein:
  a) the processing means comprises means for determining if the temperature is greater than a predefined temperature value; and b) the display means comprises means for providing a visual indication of a temperature condition if the temperature is greater than the predefined temperature value.

5. The system of claim 2 wherein:
a) the processing means comprises means for determining a service interval; and
b) the display means comprises means for providing a visual indication of the service interval.

6. The system of claim 2 wherein:
a) the processing means comprises means for determining if current to a fan in the dust collector is greater than a predefined current value; and
b) the display means comprises means for providing a visual indication of a fan overcurrent condition if the fan current is greater than the predefined current value.

7. The system of claim 2 wherein:
a) the processing means comprises means for determining if a user-defined fault has occurred within the dust collector; and
b) the display means comprises means for providing a visual indication of the user-defined fault.

8. The system of claim 2 wherein:
a) the receive means comprise means for receiving current signals representing currents supplied to a motor operating a fan for the dust collector;
a) the processing means comprises means for processing the current signals in order to determine a direction of rotation of a fan for the dust collector; and
b) the display means comprises means for providing a visual indication of the fan rotation direction.

9. The system of claim 2 wherein:
a) the receive means comprises means for receiving a signal representing a current supplied to a motor which powers a source of air flow within the dust collector;
b) the processing means comprises:
  i) means for measuring the monitored motor current to obtain a corresponding current value; and
  ii) means for associating the sampled current value with a corresponding air flow rate; and
c) the display means comprises means for outputting an indication of the air flow rate.

10. The system of claim 1, further comprising storage means for storing the plurality of signals for subsequent analysis.

11. The system of claim 1, further comprising:
a) means for coupling a plurality of the systems one each to a plurality of dust collectors;
b) means for coupling together the plurality of systems and corresponding dust collectors in a daisy chain configuration; and
b) means for interfacing the daisy chain configured systems and dust collectors to a computer for selectively monitoring and controlling the plurality of dust collectors using the computer.

12. The system of claim 1 wherein:
a) the receive means comprises:
  i) means for receiving a first signal representing an air pressure in a manifold of the dust collector;
  ii) means for receiving a second signal representing an attempt to clean one or more filters in the dust collector with a reverse burst of air pressure delivered from the manifold; and
  iii) means for receiving a third signal representing the manifold air pressure during the cleaning; and
b) the processing means comprises means for processing the first, second, and third signals and for indicating a cleaning failure if a decrease in the manifold air pressure does not occur during the cleaning.

13. The system of claim 12 wherein the processing means further comprises means for determining which element of a cleaning system, including the manifold, in the dust collector resulted in the cleaning failure.

14. The system of claim 1 wherein:
a) the receive means comprises:
  i) means for receiving a first signal representing a clean air chamber pressure or a differential air pressure between a dirty air chamber and a clean air chamber in the dust-collector;
  ii) means for receiving a second signal representing an attempt to clean one or more filters in the dust collector with a reverse burst of air pressure delivered from a manifold; and
  iii) means for receiving a third signal representing the differential air pressure or the clean air chamber pressure during the cleaning; and
b) the processing means comprises means for processing the first, second, and third signals and for indicating a cleaning failure if an increase in the differential air pressure or the clean air chamber pressure does not occur during the cleaning.

15. The system of claim 14 wherein the processing means further comprises means for determining which element of a cleaning system, including the manifold, resulted in the cleaning failure.

16. The system of claim 1 wherein:
a) the receive means comprises:
  i) means for receiving a first signal representing a differential air pressure between a dirty air chamber and a clean air chamber in the dust collector; and
  ii) means for receiving a second signal representing a decrease in the differential air pressure; and
b) the processing means comprises means for processing the first and second signals and for indicating a filter rupture if the decrease in the differential air pressure occurs at a rate greater than a predefined rate during normal operation.

17. The system of claim 1 wherein:
a) the receive means comprises:
  i) means for receiving a first signal representing a differential air pressure between a dirty air chamber and a clean air chamber in the dust collector; and
  ii) means for receiving a second signal representing a decrease in the differential air pressure; and
b) the processing means comprises means for processing the first and second signals and for indicating a filter rupture if the decrease in the differential air pressure occurs at a rate within predefined limits during normal operation.

18. The system of claim 1 wherein:
a) the receive means comprises:
  i) means for receiving a first signal representing a differential air pressure between a dirty air chamber and a clean air chamber in the dust collector; and
  ii) means for receiving a second signal representing an initiation of a cleaning process comprising a series of pulses of a reverse burst of air pressure delivered from a manifold in the dust collector; and b) the processing means comprises means for processing the first and second signals and for indicating a degree of filter obstruction based on a change in the differential air pressure during the cleaning process.

19. The system of claim 18 wherein the processing means comprises means for indicating an obstructed filter if the differential pressure does not decrease to a value within predefined limits during the cleaning process.

20. The system of claim 18 wherein the processing means comprises means for indicating an obstructed filter if the differential pressure does not decrease to a value less than a predefined pressure value during the cleaning process.

21. The system of claim 18 wherein the processing means comprises means for indicating an obstructed filter if the differential pressure increases to a value greater than a predefined pressure value during the cleaning process.

22. An integrated system for monitoring, controlling, and programming operation of a dust collector, comprising:
   a) receive means for receiving signals used in monitoring and programming the operation of the dust collector, comprising:
      i) means for receiving a plurality of signals representing a plurality of measured parameters of the dust collector; and
      ii) means for receiving one or more programming signals representing desired operating parameters of the dust collector;
   b) processing means for monitoring and programming the operation of the dust collector, comprising:
      i) monitoring means for processing the signals representing the plurality of measured parameters in order to determine operating conditions of the dust collector; and
      ii) control means for generating control signals in response to the operating conditions and the programming signals in order to maintain the operation of the dust collector; and
   c) output means for transmitting the control signals to the dust collector.

23. The system of claim 22 wherein the means for receiving one or more programming signals comprises means for receiving signals representing set points and maintenance conditions for the operation of the dust collector.

24. The system of claim 22, further comprising display means for providing a visual indication of the measured parameters.

25. The system of claim 24 wherein the measured parameters include a temperature parameter the display means comprises means for providing a visual indication of the temperature parameter.

26. The system of claim 25 wherein:
   a) the processing means comprises means for determining if the temperature parameter is greater than a predefined temperature value; and
   b) the display means comprises means for providing a visual indication of a temperature condition if the temperature parameter is greater than the predefined temperature value.

27. The system of claim 24 wherein:
   a) the processing means comprises means for determining a service interval; and
   b) the display means comprises means for providing a visual indication of the service interval.

28. The system of claim 24 wherein:
   a) the processing means comprises means for determining if current to a fan in the dust collector is greater than a predefined current value; and
   b) the display means comprises means for providing a visual indication of a fan overcurrent condition if the fan current is greater than the predefined current value.

29. The system of claim 24 wherein:
   a) the processing means comprises means for determining if a user-defined fault has occurred within the dust collector; and
   b) the display means comprises means for providing a visual indication of the user-defined fault.

30. The system of claim 24 wherein:
   a) the processing means comprises means for processing the current parameters in order to determine a direction of rotation of a fan for the dust collector; and
   b) the display means comprises means for providing a visual indication of the fan rotation direction.

31. The system of claim 24 wherein:
   a) the receive means comprises means for receiving a signal representing a current supplied to a motor which powers a source of air flow within the dust collector;
   b) the processing means comprises:
      i) means for measuring the monitored motor current to obtain a corresponding current value; and
      ii) means for associating the sampled current value with a corresponding air flow rate; and
   c) the display means comprises means for outputting an indication of the air flow rate.

32. The system of claim 22, further comprising storage means for storing the signals representing the plurality of measured parameters for subsequent analysis.

33. The system of claim 22, further comprising:
   a) means for coupling a plurality of the systems one each to a plurality of dust collectors;
   b) means for coupling together the plurality of systems and corresponding dust collectors in a daisy chain configuration; and
   b) means for interfacing the daisy chain configured systems and dust collectors to a computer for selectively monitoring and controlling the plurality of dust collectors using the computer.

34. The system of claim 22 wherein:
   a) the receive means comprises:
      i) means for receiving a first signal representing an air pressure in a manifold of the dust collector;
      ii) means for receiving a second signal representing an attempt to clean one or more filters in the dust collector with a reverse burst of air pressure delivered from the manifold; and
      iii) means for receiving a third signal representing the manifold air pressure during the cleaning; and
   b) the processing means comprises means for processing the first, second, and third signals and for indicating a cleaning failure if a decrease in the manifold air pressure does not occur during the cleaning.

35. The system of claim 34 wherein the processing means further comprises means for determining which element of a cleaning system, including the manifold, resulted in the cleaning failure.

36. The system of claim 22 wherein:
a) the receive means comprises:
i) means for receiving a first signal representing a clean air chamber pressure or a differential air pressure between a dirty air chamber and a clean air chamber in the dust collector;
ii) means for receiving a second signal representing an attempt to clean one or more filters in the dust collector with a reverse burst of air pressure delivered from a manifold; and
iii) means for receiving a third signal representing the differential air pressure or the clean air chamber pressure during the cleaning; and
b) the processing means comprises means for processing the first, second, and third signals and for indicating a cleaning failure if an increase in the differential air pressure or the clean air chamber pressure does not occur during the cleaning.

37. The system of claim 36 wherein the processing means further comprises means for determining which element of a cleaning system, including the manifold, resulted in the cleaning failure.

38. The system of claim 22 wherein:
a) the receive means comprises:
i) means for receiving a first signal representing a differential air pressure between a dirty air chamber and a clean air chamber in the dust collector; and
ii) means for receiving a second signal representing a decrease in the differential air pressure; and
b) the processing means comprises means for processing the first and second signals and for indicating a filter rupture if the decrease in the differential air pressure occurs at a rate greater than a predefined rate during normal operation.

39. The system of claim 22 wherein:
a) the receive means comprises:
i) means for receiving a first signal representing a differential air pressure between a dirty air chamber and a clean air chamber in the dust collector; and
ii) means for receiving a second signal representing a decrease in the differential air pressure; and
b) the processing means comprises means for processing the first and second signals and for indicating a filter rupture if the decrease in the differential air pressure occurs at a rate within predefined limits during normal operation.

40. The system of claim 22 wherein:
a) the receive means comprises:
i) means for receiving a first signal representing a differential air pressure between a dirty air chamber and a clean air chamber in the dust collector; and
ii) means for receiving a second signal representing an initiation of a cleaning process comprising a series of pulses of a reverse burst of air pressure delivered from a manifold in the dust collector; and b) the processing means comprises means for processing the first and second signals and for indicating a degree of filter obstruction based on a change in the differential air pressure during the cleaning process.

41. The system of claim 40 wherein the processing means comprises means for indicating an obstructed filter if the differential pressure does not decrease to a value within predefined limits during the cleaning process.

42. The system of claim 40 wherein the processing means comprises means for indicating an obstructed filter if the differential pressure does not decrease to a value less than a predefined pressure value during the cleaning process.

43. The system of claim 40 wherein the processing means comprises means for indicating an obstructed filter if the differential pressure increases to a value greater than a predefined pressure value during the cleaning process.

44. A system for controlling operation of a dust collector and for detecting cleaning failures within the dust collector, comprising:
a) input terminals for receiving a plurality of signals representing a plurality of measured parameters of the dust collector;
b) output terminals for connection to the dust collector; and
c) a processor coupled to the input terminals and the output terminals, the processor operating to:
i) process the signals representing the measured parameters in order to determine operating conditions and cleaning failures of the dust collector;
ii) generate control signals in response to the operating conditions in order to maintain the operation of the dust collector and generate diagnostic signals in response to the cleaning failures; and
ii) transmit the control signals to the output terminals, and transmit the diagnostic signals to an output device in order to provide an indication of the cleaning failures.

45. A system for monitoring, controlling, and programming operation of a dust collector, comprising:
a) first input terminals for receiving a plurality of signals representing a plurality of measured parameters of the dust collector;
b) second input terminals for receiving one or more programming signals representing desired operating parameters of the dust collector;
c) output terminals for connection to the dust collector; and
d) a processor coupled to the first input terminals, the second input terminals, and the output terminals, the processor operating to:
i) process the signals representing the plurality of measured parameters in order to determine operating conditions of the dust collector;
ii) generate control signals in response to the operating conditions and the programming signals in order to maintain the operation of the dust collector; and
iii) transmit the control signals to the output terminals.

* * * * *